United States Patent
Johansson et al.

(10) Patent No.: US 9,821,803 B2
(45) Date of Patent: Nov. 21, 2017

(54) VEHICLE SPEED AND COASTING CONTROL METHOD AND SYSTEM

(71) Applicant: SCANIA CV AB, Södertälje (SE)

(72) Inventors: Oskar Johansson, Stockholm (SE); Mikael Ögren, Södertälje (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 12 days.

(21) Appl. No.: 14/410,229

(22) PCT Filed: Jun. 26, 2013

(86) PCT No.: PCT/SE2013/050770
§ 371 (c)(1),
(2) Date: Dec. 22, 2014

(87) PCT Pub. No.: WO2014/003654
PCT Pub. Date: Jan. 3, 2014

(65) Prior Publication Data
US 2015/0321670 A1    Nov. 12, 2015

(30) Foreign Application Priority Data
Jun. 27, 2012    (SE) ...................... 1200392

(51) Int. Cl.
*B60W 30/18*    (2012.01)
*B60W 30/14*    (2006.01)
(Continued)

(52) U.S. Cl.
CPC .......... *B60W 30/143* (2013.01); *B60W 10/02* (2013.01); *B60W 10/06* (2013.01);
(Continued)

(58) Field of Classification Search
CPC ..... B60W 2550/142; B60W 2550/143; B60W 30/14; B60W 30/18072; B60W 30/143
See application file for complete search history.

(56) References Cited

U.S. PATENT DOCUMENTS

| | | | |
|---|---|---|---|
| 2005/0113212 A1* | 5/2005 | Glora ..................... | B60K 31/04 477/107 |
| 2012/0220422 A1* | 8/2012 | Wurthner ............. | B60W 10/02 477/79 |

(Continued)

FOREIGN PATENT DOCUMENTS

| | | |
|---|---|---|
| DE | 10 2008 023135 A1 | 11/2009 |
| DE | 10 2009 046340 A1 | 5/2011 |

(Continued)

OTHER PUBLICATIONS

International Search Report dated Nov. 11, 2013 issued in corresponding International patent application No. PCT/SE2013/050770.

*Primary Examiner* — Thomas Ingram
(74) *Attorney, Agent, or Firm* — Ostrolenk Faber LLP (57) ABSTRACT

A method and a system for controlling a cruise control and a transmission in a vehicle over the course of a road section, wherein prior to the road section, the vehicle has applied coasting and utilizes the cruise control. A reference speed $v_{ref}$ utilized in the cruise control during the coasting is lowered to a lowest permitted speed $v_{min}$ defined for the road section if the lowering is deemed applicable. A comparison of a drive force $F_{dd}$ requested from an engine system in the vehicle with a threshold value $F_{lim}$ for the drive force is also carried out. The coasting is then suspended if the requested drive force $F_{dd}$ exceeds the threshold value $F_{lim}$ for the drive force.

18 Claims, 6 Drawing Sheets

(51) Int. Cl.
*B60W 50/00* (2006.01)
*B60W 10/02* (2006.01)
*B60W 10/06* (2006.01)
*B60W 10/11* (2012.01)

(52) U.S. Cl.
CPC ...... *B60W 10/11* (2013.01); *B60W 30/18072* (2013.01); *B60W 50/0097* (2013.01); *B60K 2310/244* (2013.01); *B60W 2030/18081* (2013.01); *B60W 2300/125* (2013.01); *B60W 2550/142* (2013.01); *B60W 2550/143* (2013.01); *B60W 2550/402* (2013.01); *B60W 2720/10* (2013.01); *Y02T 10/52* (2013.01); *Y02T 10/84* (2013.01)

(56) References Cited

U.S. PATENT DOCUMENTS

| 2012/0220424 A1* | 8/2012 | Staudinger | B60W 30/16 477/80 |
| 2015/0197247 A1* | 7/2015 | Ichinokawa | B60W 30/143 701/93 |
| 2016/0009278 A1* | 1/2016 | Roos | B60W 30/143 701/93 |

FOREIGN PATENT DOCUMENTS

| WO | WO 2005/084995 A1 | 9/2005 |
| WO | WO 2008/094114 A1 | 8/2008 |

* cited by examiner

VEHICLE SPEED AND COASTING CONTROL METHOD AND SYSTEM

CROSS-REFERENCE TO RELATED APPLICATIONS

The present application is a 35 U.S.C. §§371 national phase conversion of PCT/SE2013/050770, filed Jun. 26, 2013, which claims priority of Swedish Application No. 1200392-7, filed Jun. 27, 2012. The contents of both applications are incorporated by reference herein. The PCT International Application was published in the English language.

TECHNICAL FIELD

The present invention relates to a method for controlling a cruise control and a transmission in a vehicle and to a system for controlling a cruise control and a transmission in a vehicle.

The present invention also relates to a computer program and a computer program product which implement the method according to the invention.

BACKGROUND

For motor vehicles, such as, for example, cars, trucks and buses, a fuel cost represents a significant expense for the owner or user of the vehicle. For a hauling company, for example, apart from the cost of procurement of the vehicle, the main items of expenditure for the running of a vehicle are constituted by pay to the driver of the vehicle, costs of repairs and maintenance, and fuel for propulsion of the vehicle. The fuel cost can here have a very large impact on profitability for the haulage company. Hence a number of different systems have been developed in order to reduce fuel consumption, such as, for example, fuel-efficient engines and fuel-saving cruise control devices.

Figure 1:
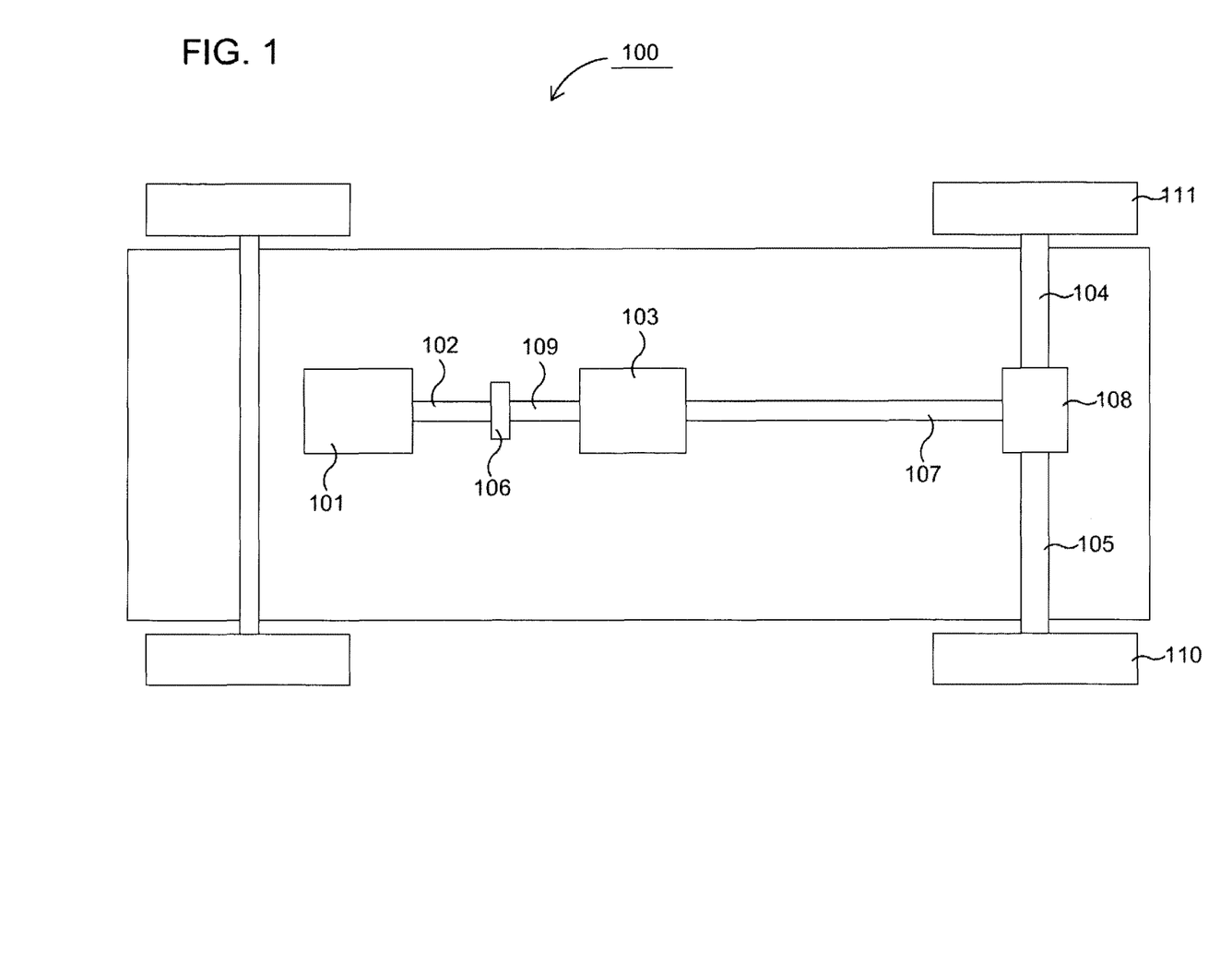
FIG. 1 shows in schematic representation parts of an exemplary vehicle.
Figure 8:
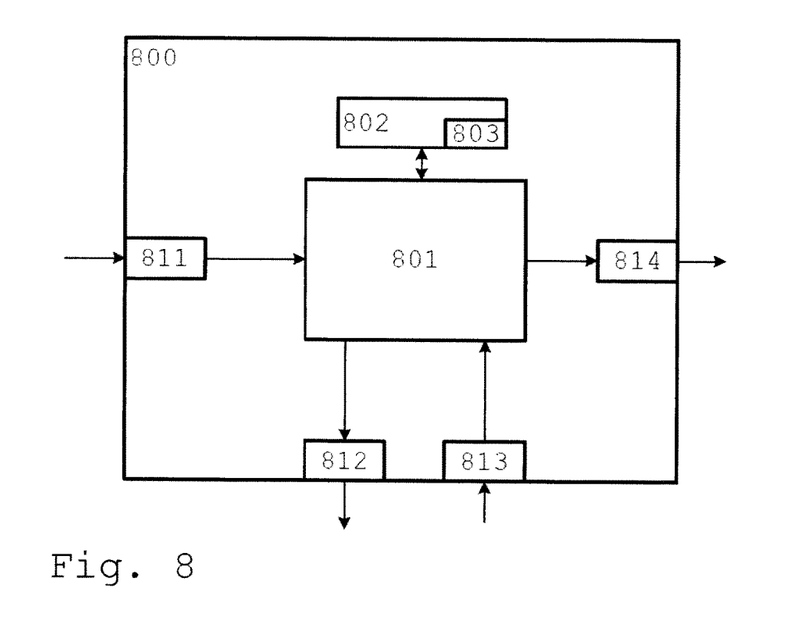
FIG. 8 shows a control unit according to the invention.

FIG. 1 shows in schematic representation a drive train in a vehicle 100. The drive train comprises an internal combustion engine 101, which is connected in a conventional manner, via an output shaft 102 from the internal combustion engine 101, usually via a flywheel, to an input shaft 109 of a gearbox 103 by means of a clutch 106. The clutch 106 can be constituted, for example, by an automatically controlled clutch, and is controlled by the control system of the vehicle via a control unit 800 (FIG. 8). The control unit 800 can also control the gearbox 103.

The gearbox 103 is here illustrated schematically as a unit. The gearbox 103 can also, however, physically consist of a plurality of interacting gearboxes, for example of a range gearbox, a main gearbox and a split gearbox, which are arranged along the drive train of the vehicle. The gearbox can comprise a suitable number of gear positions. In contemporary gearboxes for heavy duty vehicles are usually found twelve forward gears, two reverse gears and a neutral gear position. If the gearbox 103 physically consists of a plurality of part gearboxes according to the above, these twelve forward gears are distributed amongst two gears in the range gearbox, three gears in the main gearbox and two gears in the split gearbox, which together constitute twelve gear positions (2×3×2=12). The vehicle 100 further comprises drive shafts 104, 105, which are connected to the drive wheels 110, 111 of the vehicle and which are driven by an output shaft 107 from the gearbox 103 via an axle gearing 108, such as, for example, a conventional differential.

The vehicle 100 further comprises a variety of different braking systems, such as a conventional service braking system, which can comprise, for example, brake disks with associated brake linings (not shown) arranged next to each wheel. The engine 101 can be controlled on the basis of instructions from a cruise control, in order to maintain a constant actual vehicle speed and/or vary the actual vehicle speed so that a fuel consumption which is optimized within reasonable speed limits is obtained. The engine 101 can also be controlled by a driver of the vehicle.

BRIEF DESCRIPTION OF THE INVENTION

In descents, for example, or in situations in which the vehicle must reduce its actual speed, fuel savings have historically been made by a reduced request for positive engine torque, alternatively with the aid of dragging. The reduced request for positive engine torque means that the driving force in the direction of travel, which the internal combustion engine delivers via the drive wheels, is reduced, for example by reduced fuel injection in the engine 101, thereby reducing the fuel consumption.

Dragging means driving the vehicle with closed drive train, that is to say with the combustion engine 101 connected to the drive wheels 110, 111 of the vehicle, at the same time as the fuel supply to the internal combustion engine 101 is shut off. One advantage with this type of measure is that, since fuel supply to the internal combustion engine is shut off, the consumption of the internal combustion engine is also equal to zero. The measure also means, however, that the internal combustion engine 101 will be driven by the drive wheels of the vehicle via the drive train, so that so called "dragging" is achieved, wherein the internal losses of the internal combustion engine give rise to a braking action, that is to say that the vehicle is engine-braked.

Although a reduction in requested engine torque and dragging lowers the fuel consumption, this lowering is not always optimized, firstly since the reduced engine torque, despite everything, generally consumes more fuel than is necessary and secondly since the dragging, moreover, provides an engine braking of the vehicle which is not economical on fuel.

One way of further lowering the fuel consumption is to coast the vehicle by, as described below, either utilizing a neutral gear position in the gearbox 103 or opening the clutch.

Through the use of coasting, a still lower fuel consumption than with dragging is achieved, since engine braking is eliminated, at the same time as the engine speed is reduced to a minimum. Coasting can be realized with the engine 101 running or shut off.

In cruise control driving, small undershoots for the actual speed of the vehicle below the set speed $v_{set}$ of the cruise control can cause the coasting to be erroneously suspended where previously known systems are utilized, which adversely affects the fuel saving obtained from the coasting function in these systems and results in inconsistent coasting, that is to say in coasting being suspended for a short time so as then to be utilized again.

One object of the invention is to improve the fuel saving when coasting is applied and to avoid brief and erroneous suspensions of the coasting.

This object is achieved by the above-stated method or system. The object is also achieved by the above-stated computer program and computer program product.

Through the use of the present invention, the object, that is to say of improving profitability when coasting is applied and, at the same time, reducing inconsistency due to brief suspensions of coasting, is achieved.

According to the present invention, a reference speed $V_{ref}$ utilized in the cruise control is lowered if this lowering is deemed applicable. After this, a drive force $F_{dd}$ requested from an engine system in the vehicle is compared with a threshold value $F_{lim}$, in order to assess whether coasting shall be suspended or not. If the requested drive force $F_{dd}$ exceeds the threshold value $F_{lim}$, the coasting is suspended. The lowering of reference speed $v_{ref}$ according to the present invention enables the coasting to continue in situations in which the previously known solutions would have been suspended, which reduces the fuel consumption and also gives greater consistency in the choice of transmission mode, where transmission mode comprises coasting as well as gear positions in the gearbox. An exact and balanced prediction of whether coasting shall be suspended or not is hereby obtained.

Through the use of the present invention, a very exact and well informed choice of whether coasting shall be applied or not over the course of a road section ahead of the vehicle is obtained. The purpose of making this choice related to the use of coasting is to bring down the engine speed to as low as possible and thus save fuel.

According to the present invention, a reference speed $v_{ref}$ utilized in the cruise control is lowered if this lowering is deemed applicable. After this, a drive force $F_{dd}$ requested from an engine system in the vehicle is compared with a threshold value $F_{lim}$ in order to assess whether coasting shall be suspended or not. If the requested drive force $F_{dd}$ exceeds the threshold value $F_{lim}$, the coasting is suspended. The lowering of reference speed $v_{ref}$ according to the present invention enables the coasting to continue to be applied, however, in situations in which the previously known solutions would have been suspended, which reduces the fuel consumption and also gives greater consistency in the choice of transmission mode, where transmission mode comprises coasting as well as gear positions in the gearbox. An exact and balanced prediction of whether coasting shall be suspended or not is hereby obtained.

In this document, coasting constitutes an imaginary/fictitious highest gear position, and the choice of a lower transmission mode constitutes a suspension of this coasting. In other words, a downshift is here made from an imaginary/fictitious highest gear position into a physical gear position, in which the physical gear position, for example, can constitute any one of the higher gears in the gearbox 103.

The present invention can be implemented without much adding to the complexity in the vehicle, at least in part since the invention can make use of data which are already available in other systems in the vehicle, such as road slope information to which a cruise control in the vehicle has access.

The present invention can be utilized both in pedal driving, that is to say that the driver himself regulates the requesting of torque from the engine, and in cruise control driving. The term pedal driving here and in this document comprises essentially all types of control system which are suited to regulating the torque demand, such as, for example, a gas pedal or a manual throttle device.

BRIEF DESCRIPTION OF FIGURES

The invention will be illustrated in greater detail below on the basis of the appended drawings, in which identical reference symbols are used for identical parts, and wherein.

DESCRIPTION OF PREFERRED EMBODIMENTS

Figure 2:
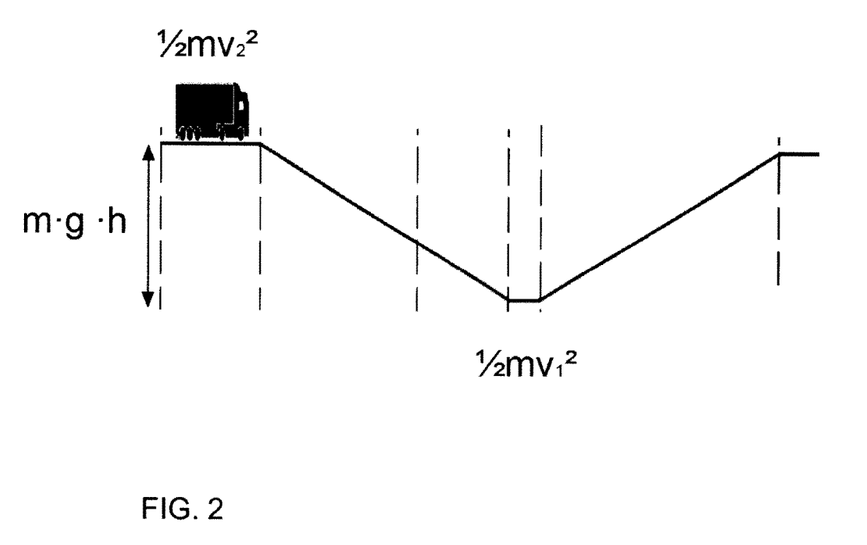
FIG. 2 shows in schematic representation a driving situation.

FIG. 2 shows in schematic representation an example of a driving situation, a descent followed by an ascent, in which the present invention can be applied. The invention can also be applied in other driving situations, for example, in the event of a reduction in speed, which can occur on a flat road. For pedagogical reasons, however, the driving situation in FIG. 2 will here be used to describe principles which are utilized by the invention.

For the vehicle in FIG. 2, an energy relationship can be established for the driving situation:

$$mgh = (\tfrac{1}{2}mv_2^2 - \tfrac{1}{2}mv_1^2) + (F_{air} + F_{rr} + F_{eng} + F_{gb} + F_{axle/nav}) \cdot s \quad \text{(equation 1)}$$

in which:
  mgh is the potential energy of the vehicle;
  $\tfrac{1}{2}mv_2^2$ is the kinetic energy of the vehicle up on the top of the hill;
  $\tfrac{1}{2}mv_1^2$ is the kinetic energy of the vehicle at the bottom of the hill;
  $F_{air}$ is the air resistance of the vehicle;
  $F_{rr}$ is the rolling resistance of the vehicle;
  $F_{eng}$ is the engine friction;
  $F_{gb}$ is the gearbox friction;
  $F_{axle/nav}$ friction in rear axle, seals and wheel bearings; and
  s is the traveled distance between the top and the bottom of the hill.

As can be seen from equation 1, a number of forces $F_{air}$, $F_{rr}$, $F_{eng}$, $F_{gb}$, and $F_{axle/nav}$ act against the motion of the vehicle.

Figure 3:
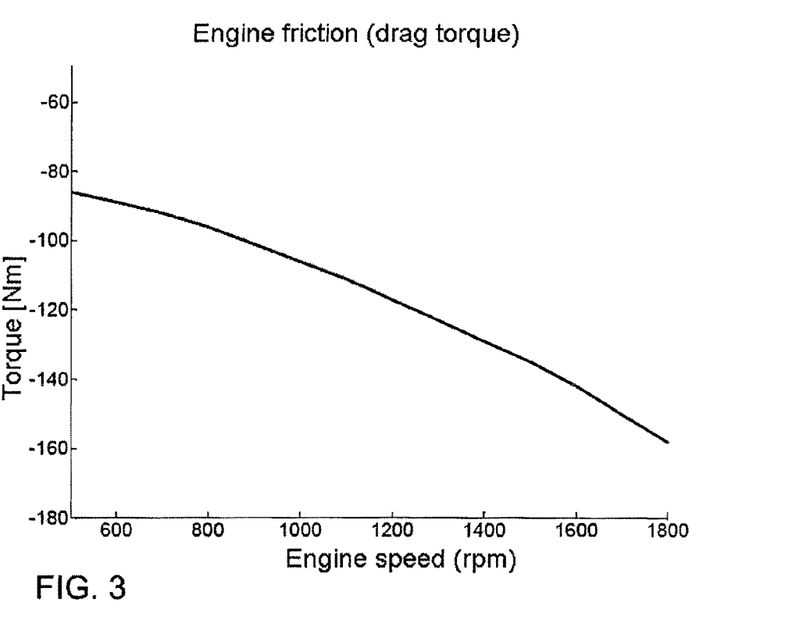
FIG. 3 shows a graph representing engine friction as a function of engine speed.

FIG. 3 shows an example of engine friction for a truck engine. It can here be seen that the negative torque corresponding to the engine friction $F_{eng}$, which inhibits the motion of the vehicle, increases with increased rotation speed for the engine 101 (note that the y-axis has negative gradation in FIG. 3). Conversely, reduced rotation speed for the engine gives reduced force for the engine friction $F_{eng}$, that is to say reduced negative torque, which is exploited by the present invention.

Coasting means in this document that the engine 101 of the vehicle is disengaged from the drive wheels 110, 111 of the vehicle, i.e. that the drive train is opened. This disengagement of the drive wheels 110, 111 from the engine 101, also referred to as opening of the drive train, can be achieved, for example, by setting the gearbox 103 in a neutral position or by opening the clutch 106. In other words, essentially no force is transmitted from the engine 101 to the drive wheels 110, 110 during the coasting.

Disengagement of the engine 101 from the drive wheels 110, 111 of the vehicle 100 when the vehicle 100 is in motion is thus referred to in this document as coasting.

Coasting brings about a considerable reduction in the forces acting against the motion of the vehicle, since the force for the engine friction $F_{eng}$ then diminishes to a value essentially equal to zero (0). Hence, coasting can considerably lower the fuel consumption by virtue of this reduced resistance against the vehicle. In certain cases of coasting, idling fuel would have to be supplied to the engine to prevent the engine from stalling, while in other cases the engine can be allowed to stall.

The result is that, from a fuel aspect, it is often more advantageous to drive the vehicle with open drive train, that is to say in coasting mode, than with dragging, that is to say when the drive train is closed at the same time as the fuel supply to the engine 101 is shut off. The reason for this is that the limited quantity of fuel which is required to keep the internal combustion engine running when the internal combustion engine is disengaged is counterbalanced by the fact that the vehicle can continue with disengaged internal combustion engine for a longer distance, for example after a downslope has been negotiated. This is due, inter alia, to the fact that the vehicle will reach a higher speed on, for example, the downslope when driven with disengaged internal combustion engine compared with when the vehicle is driven with closed drive train without fuel supply.

In coasting, moreover, the force which inhibits the driving of the vehicle will be lower when the internal combustion engine of the vehicle is disengaged from the drive shaft, since there is no engine brake force inhibiting the progress of the vehicle. This makes the vehicle decelerate more slowly, for example, when the vehicle reaches the end of the downslope, which in turn means that coasting can often be utilized for a relatively long distance after, for example, an end of a descent. A considerable reduction in fuel consumption is hereby obtained.

According to the present invention, it is determined when, that is to say at what moment, a coasting shall be suspended, in which account is also taken of the cruise control function for a cruise control in the vehicle.

According to the present invention, the cruise control of the vehicle is controlled by lowering of the reference speed $v_{ref}$ utilized in this cruise control during the coasting to a lowest permitted speed $v_{min}$ defined for the road section, if this lowering is deemed applicable. Thus, the reference speed $v_{ref}$ utilized by the cruise control is here adjusted to a lower level if this is suitable.

For traditional cruise controls, the reference speed $v_{ref}$ is equal to the set speed $v_{set}$ which is chosen by, for example, the driver.

For cruise controls which regulate the reference speed, for example look ahead cruise controls (LACC), the driver chooses a set speed $v_{set}$ for the cruise control. This set speed $v_{set}$ is related to a speed which the vehicle shall maintain on a flat road. Reference speed regulating cruise controls can then, on the basis at least of this set speed $v_{set}$, control the reference speed $v_{ref}$, which constitutes the target value with which the engine system is regulated such that a desired actual vehicle speed is obtained, for example, on undulating roads.

Since the reference speed $v_{ref}$, for both traditional cruise controls and for LACC's is the target value against which the engine system is regulated, it is this target value which is critical to whether an engine torque/a drive force will be requested from the engine system or not. Only once the reference speed $v_{ref}$ is passed below, will torque/drive force be requested from the engine system.

The present invention compares a drive force $F_{dd}$, which is requested from the engine system, with a threshold value $F_{lim}$ for this drive force. If the requested drive force $F_{dd}$ exceeds this threshold value $F_{lim}$, according to the invention, the coasting is suspended.

Since the reference speed $v_{ref}$ prior to this comparison according to the invention can be adjusted downward if so required, a very flexible and effective control of the transmission in the vehicle, that is to say of whether coasting shall be applied or not, is obtained. The downward adjustment of the reference speed $v_{ref}$ can be used, for example, for coasting over short, flatter portions of the road section, by letting the speed first drop there so as then to roll up to speed again, instead of needing to suspend the coasting, for example, by engaging a gear.

Figure 4:
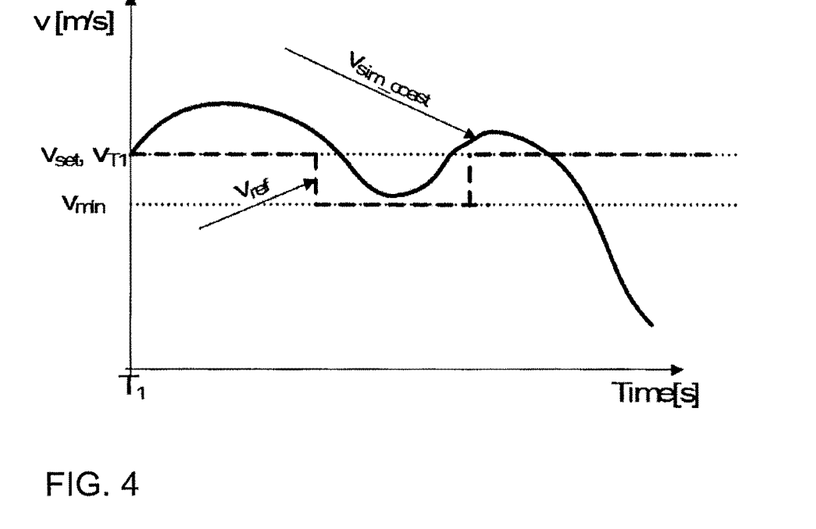
FIG. 4 shows an example of a simulation according to the invention.
Figure 5:
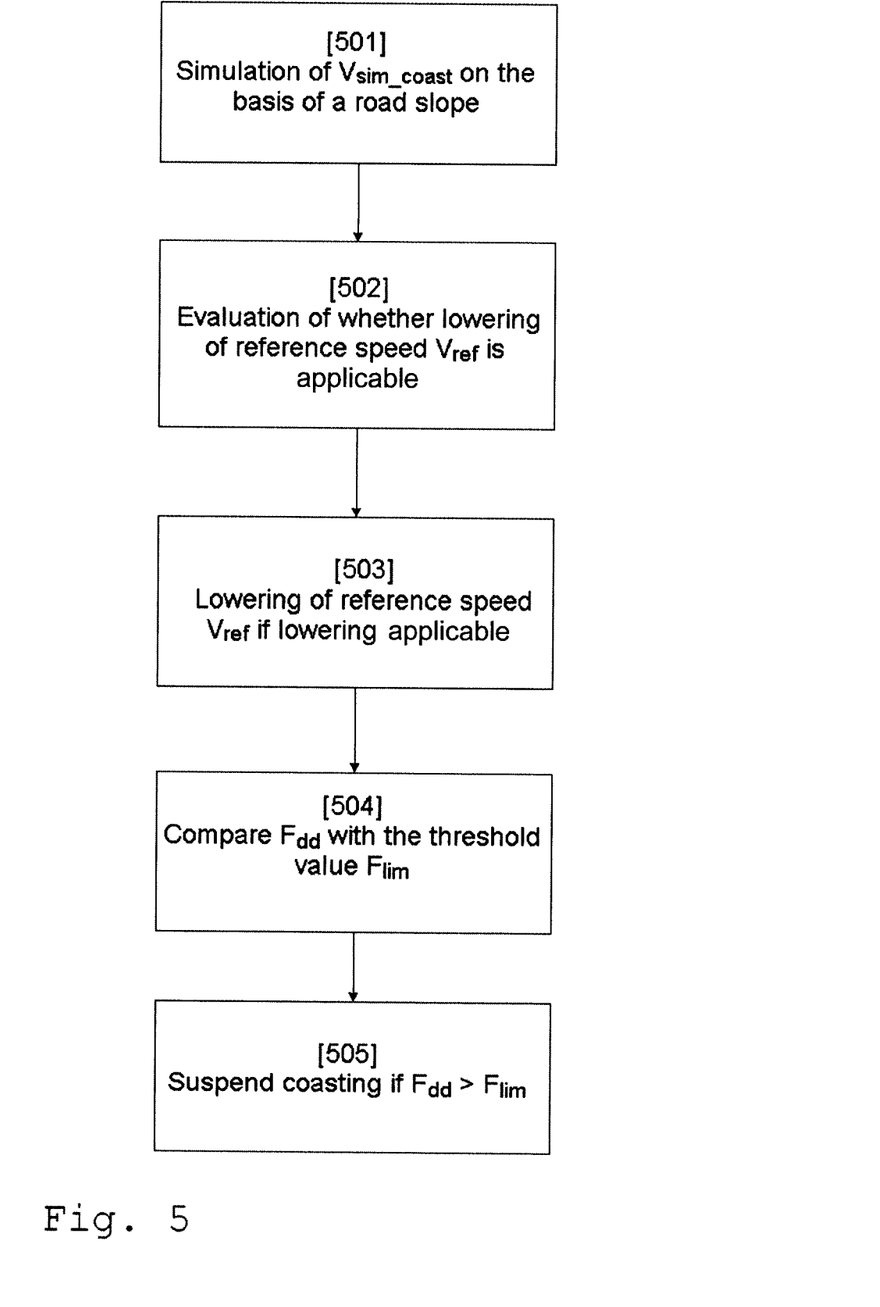
FIG. 5 shows a flowchart for a method according to the invention.

In the non-limiting example illustrated in FIG. 4 there is a simulated future speed profile $v_{sim\_coast}$, which will be described in greater detail below. FIG. 4 shows schematically how the reference speed $v_{ref}$ of the cruise control is lowered, which prevents the coasting from being suspended due to drive force being requested during the first temporary and short decline of the future speed profile $v_{sim\_coast}$. FIG. 4 will be described in greater detail below. FIG. 5 shows a flowchart for the method according to the present invention.

In a first step 501 of the method, a simulation of a future speed profile $v_{sim\_coast}$ for an actual speed related to coasting for the vehicle 100 over the course of the road section is conducted. Simulation is conducted when the road section lies ahead of the vehicle and is based at least on a road slope. This road slope is obtained from map data in combination with positioning information or from a road slope encountered by the vehicle in the simulation instance.

In a second step 502 of the method, an evaluation is carried out of whether a lowering of a reference speed $v_{ref}$, which is a target value against which an engine system in the vehicle is regulated and which is utilized in the cruise control during the coasting, is applicable. Lowering is deemed applicable for a portion of the road section if the future speed profile $v_{sim\_coast}$ related to coasting during that portion is less than a set speed $v_{set}$ for the cruise control and, at the same time, is greater than a lowest permitted speed $v_{min}$ defined for the road section.

In a third step 503 of the method, a lowering of the reference speed $v_{ref}$ is carried out if this lowering is deemed applicable. As has been stated above, the reference speed $v_{ref}$ which has been used by the vehicle during the coasting before the vehicle reached the road section now lying ahead of the vehicle is utilized by the cruise control in the vehicle.

In a fourth step 504 of the method, the drive force $F_{dd}$ which is requested from the engine system is compared with a threshold value $F_{lim}$ for the drive force.

In a fifth step 505 of the method, the coasting is suspended if the requested drive force $F_{dd}$ is greater than the threshold value $F_{lim}$.

The suspension of the coasting is effected, according to one embodiment, by the control system itself. According to another embodiment, the control system presents the proposal that the coasting should be suspended, whereafter the driver has an opportunity to choose whether the coasting shall be suspended or not.

According to one embodiment of the invention, the assessment of whether the lowering is applicable or not is based on a simulation of a future speed profile $v_{sim\_coast}$ for an actual speed related to coasting for the vehicle over the course of the road section. This simulation is conducted at the first moment $T_1$, when the road section lies ahead of the vehicle and is conducted on the basis at least of a road slope for the road section.

Thus, the simulation is conducted such that it is founded on the current position and situation of the vehicle at the first moment $T_1$ and looks forward over the road section, wherein the simulation is made on the basis of a road slope for the road section.

For example, the simulation can be conducted in the vehicle at a predetermined frequency, such as for example at the frequency of 1 Hz, which means that a new simulation result is ready every second. The road section for which the simulation is conducted comprises a predetermined section ahead of the vehicle; this, for example, can be 1-4 km long. The road section can also be seen as a horizon ahead of the vehicle, for which the simulation is to be conducted.

Apart from the above-stated parameter of road slope, the simulation can also be based on one or more of a driving method, a current actual vehicle speed, at least one engine characteristic, such as maximum and/or minimum engine torque, a vehicle weight, an air resistance, a rolling resistance, a gear ratio in the gearbox and/or the drive train, a wheel radius.

The road slope on which the simulations are based can be obtained in a number of different ways. The road slope can be determined on the basis of map data, for example from digital maps comprising topographical information, in combination with positioning information, such as, for example GPS information (Global Positioning System). With the aid of the positioning information, the position of the vehicle in relation to the map data can be established, so that the road slope can be extracted from the map data.

In many present day cruise control systems, map data and positioning information are utilized in the cruise control. Such systems can then provide map data and positioning information to the system for the present invention, the effect of which is that the added complexity for the determination of the road slope is minimized.

The road slope on which the simulations are based can be obtained by estimating the road slope encountered by the vehicle in the simulation instance. There are many ways of estimating this road slope, for example, based: on an engine torque in the vehicle, on an acceleration for the vehicle, on an accelerometer, on GPS information, on radar information, on camera information, on information from another vehicle, on positioning information and road slope information stored earlier in the vehicle, or on information obtained from a traffic system related to the road section. In systems in which information exchange between vehicles is utilized, road slope estimated by one vehicle can also be made available to other vehicles, either directly, or via an intermediate unit such as a database or the like.

According to one embodiment of the present invention, the evaluation of whether the lowering of the reference speed $v_{ref}$ is applicable is based on this simulation of the future speed profile $v_{sim\_coast}$ for coasting. The lowering is here deemed applicable for a portion of the road section if the simulated future speed profile $v_{sim\_coast}$ during this portion is less than a set speed $v_{set}$ utilized by the cruise control and, at the same time, is greater than the lowest permitted speed $v_{min}$. This is illustrated in FIG. 4, in which the simulated future speed profile $v_{sim\_coast}$ from a current speed $v_{T1}$, which corresponds to the set speed $v_{set}$ for the cruise control, at the first moment $T_1$ first increases at the start of the road section, so as then to temporarily drop below the set speed $v_{set}$. When the simulated future speed profile $v_{sim\_coast}$ has fallen below the set speed $v_{set}$, it remains greater than the lowest permitted speed $v_{min}$ in the example shown in FIG. 4. According to this embodiment of the invention, the lowering of the reference speed $v_{ref}$ shall hence be carried out.

As the decision concerning this lowering of the reference speed $v_{ref}$ is based on a simulation of the future speed profile $v_{sim\_coast}$ for the road section, a well founded evaluation of the situation is obtained, which leads to a factually based control of both the cruise control and the coasting in the vehicle.

Through the use of the present invention, the likelihood that a suspension of coasting is correct is increased, since the simulations are made over a longer time period. Previously known solutions have failed to exploit the opportunity to adjust the reference speed $v_{ref}$ according to the predicted variation in the vehicle speed, which, for example, in the case shown in FIG. 4, had led to an erroneous suspension of coasting upon the temporary decline in the future speed profile $v_{sim\_coast}$ for the road section. The embodiment according to the invention thus gives a more consistent coasting and, from a fuel perspective, a more optimal control of the cruise control and the coasting.

According to one embodiment, account is also taken in the simulations of an adopted driving method, wherein this driving method can comprise one or more of cruise control driving, driving with drag torque, driving according to an arbitrary torque profile, and gas pedal driving. The simulation can also take account of one or more vehicle parameters, such as, for example, the weight of the vehicle.

As will be appreciated by the person skilled in the art, the requested drive force $F_{dd}$ has an equivalence in a torque $M_{dd}$ requested in the vehicle. If this torque is utilized according to the invention, it compares with a torque threshold value $M_{lim}$ corresponding to the drive force threshold value $F_{lim}$. The torque $M_{dd}$ can here be a drive wheel torque or an engine torque.

The requested drive force $F_{dd}$ and the corresponding torque $M_{dd}$ can be determined on the basis of one of more of a system for controlling a speed for the vehicle, a driver-controlled throttle control mechanism, a driver-controlled brake control mechanism and a vehicle-specific drive force demanding device.

The control of the cruise control and of the transmission according to the present invention can be utilized where torque is manually requested from the engine 101, that is to say in pedal driving, or in cruise control driving.

Figure 6:
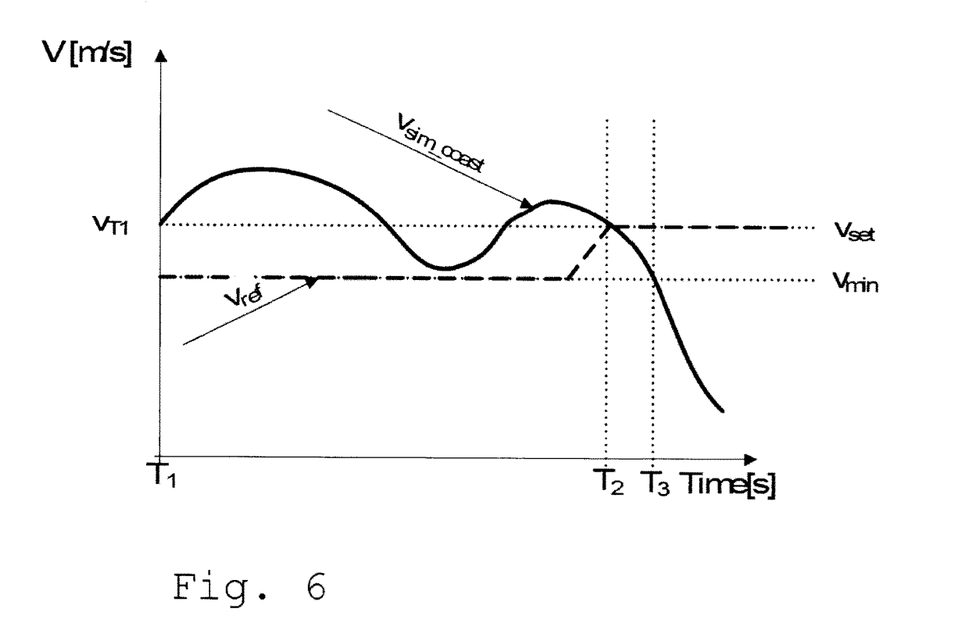
FIG. 6 shows an example of a simulation according to the invention.

According to one embodiment of the present invention, which is illustrated in FIG. 6, the reference speed $v_{ref}$ reverts from the lowering to the set speed $v_{set}$ for the cruise control and reaches the set speed $v_{set}$ at a second moment $T_2$. At the second moment $T_2$, the future speed profile $v_{sim\_coast}$ related to coasting falls below the set speed $v_{set}$ immediately prior to a third moment $T_3$, when the future speed profile $v_{sim\_coast}$ related to coasting falls below the lowest permitted speed $v_{min}$. In other words, the lowering of the reference speed $v_{ref}$ is here suspended such that it reaches the set speed $v_{set}$ at the second moment $T_2$. This has an advantage in that a gentle transition from coasting to non-coasting, for example cruise control driving with gear in, is obtained. Previously known solutions had led to a situation in which the cruise control had needed to accelerate the vehicle to $v_{set}$ at the third moment $T_3$.

According to one embodiment of the invention, the lowering of the reference speed $v_{ref}$ is suspended, that is to say that a reversion of the reference speed $v_{ref}$ is realized if a first time period $T_{12}$, from the first moment $T_1$, when the simulation is conducted, to the second moment $T_2$, is shorter than a time limit value $T_{lim}$. This has an advantage in that an especially gentle transition from coasting to cruise control is obtained, since it is certain that the gear has had time to be engaged and sufficient engine torque has had time to be built up in order to maintain the set speed $v_{set}$ at the second moment $T_2$.

The reversion of the reference speed $v_{ref}$ from its lowered value can be effected by the realization of a ramping of the reference speed $v_{ref}$ from its lowered value, that is to say from the lowest permitted speed $v_{min}$, to the set speed $v_{set}$. A flexible reversion for the reference speed $v_{ref}$ is hereby obtained.

According to one embodiment, the magnitude of the lowest permitted speed $v_{min}$, that is to say the level of the lowest permitted speed $v_{min}$, is related to a current actual speed $v_{act}$ for the vehicle. According to one embodiment, the magnitude of the highest permitted speed $v_{max}$ is related to a downhill speed control velocity $v_{dhsc}$ for the vehicle.

According to one embodiment, the magnitude of the lowest permitted speed $v_{min}$ and/or the highest permitted speed $v_{max}$ can be determined at least partially on the basis of information related to a cruise control system in said vehicle, for example on the basis of a set speed $v_{set}$, that is to say a driver-selected speed, for a cruise control system, or on the basis of a reference speed $v_{ref}$, which is utilized by said cruise control system to control a speed regulator. The determination of the lowest permitted speed $v_{min}$ and/or the highest permitted speed $v_{max}$ can also be realized by the cruise control system and made available to the system for the present invention.

According to one embodiment of the present invention, the system according to the present invention is integrated at least partially with cruise control logic of a cruise control system in the vehicle. The lowest permitted speed $v_{min}$ and/or the highest permitted speed $v_{max}$ can then be controlled by the cruise control logic of the vehicle. For example, an intelligent cruise control lowers the vehicle speed in advance of descents, since the vehicle will accelerate anyway during the descent. According to this embodiment, the cruise control can also initiate a lowering of the lowest permitted speed $v_{min}$ and thereby prolong the time in coasting mode and/or in the highest possible gear for the vehicle. This lowering of the lowest permitted speed $v_{min}$ can be achieved, for example, if the lowest permitted speed $v_{min}$ is related to the reference speed $v_{ref}$, which is the target value which is lowered by the cruise control in the face of descents, wherein the regulation of the lowest permitted speed $v_{min}$ is obtained automatically. For example, the lowest permitted speed $v_{min}$ can constitute a percentage of the reference speed $v_{ref}$.

The speed limit values which are utilized by the present invention, that is to say the lowest permitted speed $v_{min}$ and/or the highest permitted speed $v_{max}$ can generally be determined on the basis of a number of different methods. For example, these limit values can be fed in by the driver, constitute a percentage of an actual speed $v_{act}$ for the vehicle, constitute a percentage of a set speed $v_{set}$ for a cruise control system in the vehicle and/or be based on historical driving of the vehicle. The historical driving can be taken into account, for example, by utilizing an adaptive algorithm which is updated during the progress of the vehicle.

As a non-limiting example it can be cited that the following values could be utilized for the speed limit values in this document:

$v_{min}$=82 km/h or $v_{min}$=0.98×$v_{set}$km/h;

$v_{max}$=90 km/h or $v_{max}$=1.06×$v_{set}$ km/h, or $v_{max}$=0.995×$v_{dhsc}$ km/h; and $v_{lim}$=85 km/h or $v_{min}$=1×$v_{set}$ km/h.

As a non-limiting example it can be cited that the first time period $T_{12}$ could have the length $T_{12}$=10 seconds.

The lowest permitted speed $v_{min}$ and/or the highest permitted speed $v_{max}$ can be altered dynamically and can have different values for different transmission modes.

As has been described above, road slope can be determined on the basis of map data and positioning information. If such data are not available, the simulations can be based on estimates of the road slope encountered by the vehicle in the simulation instance. This places greater demands on the magnitude of the lowest permitted speed $v_{min}$ and the highest permitted speed $v_{max}$, since the simulations are less exact and more diverse in magnitude. Moreover, according to one embodiment of the invention, the length of the horizon, that is to say the road section, can be shortened in order to counter these variations.

When the road slope for the road section is approximated with the road slope encountered by the vehicle in the simulation itself, an optimal result will be obtained in the case of a gentle descent. Gentle descents are ideal for coasting if the road slope, for example, is such that the simulated future speed profile $v_{sim\_coast}$ lies within its permitted range, between the lowest permitted speed $v_{min}$ and the highest permitted speed $v_{max}$.

One advantage of simulating future speed profiles on the basis of current slope is that the same algorithm can be used both for roads and vehicles in which there is no access to future road slope and for roads and vehicles in which there is access to future road slope. Moreover, the simulation makes use of speed-dependent terms, such as, for example, air resistance and engine torque, so that a good estimate of how the vehicle will behave from this point forward is obtained even without knowledge of the future road slope.

Figure 7:
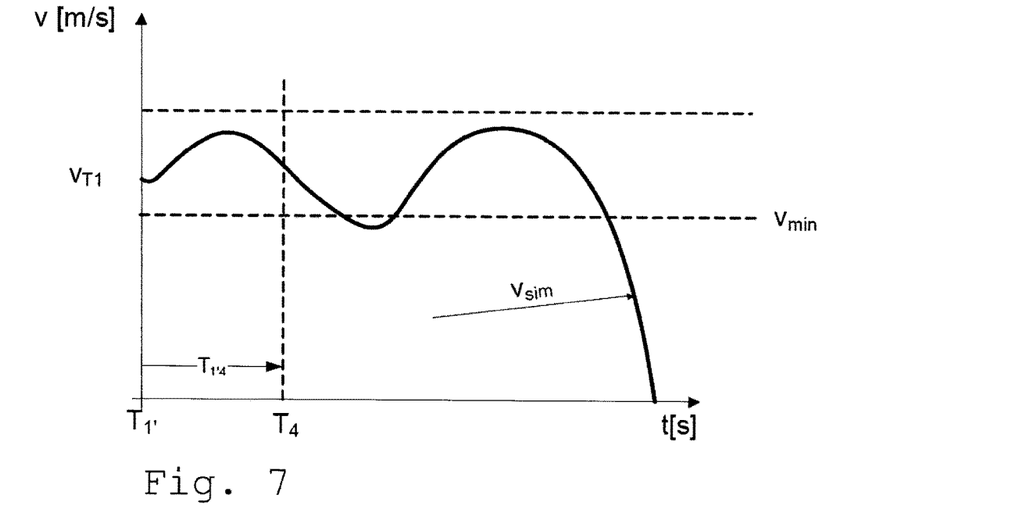
FIG. 7 shows an example of a simulation according to the invention.

According to one embodiment of the invention, the transmission mode, for example coasting, which has been applied by the vehicle prior to the road section, that is to say before the first moment $T_1$, or a transmission mode which will be applied over the course of or after the road section, has been chosen, or will be chosen, by conducting one or more simulations of future speed profiles $v_{sim}$ for the road section ahead of the vehicle 100, in which the simulations for each of the at least one future speed profiles $v_{sim}$ are based on a road slope and on a transmission mode for the vehicle. An example of such a simulation is shown in FIG. 7. Here, one or more simulations for gears in the gearbox 103, for open clutch 106, and/or for neutral gear position in the gearbox 103 can be conducted. According to one embodiment, account is also taken in the simulations of an adopted driving method, in which this driving method can comprise one or more of cruise control driving, driving with drag torque, driving according to an arbitrary torque profile, and gas pedal driving. The simulation can also take account of one or more vehicle parameters, such as, for example, the weight of the vehicle.

Next, the applicability of the transmission modes which are related to the at least one simulated future speed profiles $v_{sim}$ is evaluated. A transmission mode is here deemed applicable if its related simulated future speed profile $v_{sim}$ is greater than the above described lowest permitted speed $v_{min}$ throughout the third time period $T_{1\cdot 4}$, which extends from a further first moment $T_{1'}$ when the simulations are conducted, to the fourth, later moment $T_4$. The further first moment $T_{1'}$ does not here normally coincide with the above-stated first moment $T_1$.

After this, a transmission mode is chosen for utilization on the basis of the evaluation. Typically, a transmission mode which has been deemed applicable is chosen here. According to one embodiment of the invention, a transmission mode for coasting, if some such has been deemed to be applicable, is chosen here. Otherwise, a transmission mode for the gear position which has been deemed to be applicable is chosen. The choice of the transmission mode to be utilized in the vehicle is made, according to one embodiment, by the control system itself. According to another embodiment, the control system presents the suitable transmission mode to the driver with the aid of a display unit, whereafter the driver has an opportunity to choose whether the presented transmission mode shall be utilized or not. In this document, applicable means usable.

According to one embodiment, the fourth moment $T_4$ is chosen such that the third time period $T_{1\cdot 4}$ corresponds to a smallest/shortest permitted time period for which a gear should be utilized in order to avoid inconsistent gearshift. Inconsistent gearshift here comprises shifts between different gears/transmission modes at relatively high frequency. Thus the second time period $T_{1\cdot 4}$ has a length which ensures that the driver is not subjected to unnecessarily frequent and irritating gearshift.

As will be appreciated by the person skilled in the art, sequences of choices of transmission mode as are described in connection with FIG. 7, as well as choices of lower transmission mode as are described, for example, in connection with FIG. 5, can be achieved. Sequences of one or more of upshifts, coastings and downshifts can hereby be obtained by utilization of different embodiments of the present invention.

According to one embodiment of the present invention, the lowering of the reference speed $v_{ref}$ is deemed applicable essentially directly at the point when said coasting is activated. Thus, for this embodiment, the reference speed $v_{ref}$ will be lowered to a value corresponding to the lowest permitted speed $v_{min}$ as soon as coasting is activated in the vehicle. This has an advantage in that the algorithm of the function becomes simple, and hence easy to implement, since the same thing, that is to say the lowering, is always carried out when coasting is activated. Moreover, the function becomes predictable for the driver, which further increases the confidence of the driver in the function, as well as his wish to utilize it.

According to one embodiment of the present invention, the lowering is suspended, that is to say that the reference speed $v_{ref}$ reverts from its lowered level to a set speed $v_{set}$ for the cruise control essentially directly as the coasting is suspended. This has an advantage in that if the coasting is suspended, for example by the driver, by the system according to the invention, or by another system, the cruise control will directly start to work toward a reference speed $v_{ref}$ requested by the driver. The reversion of the reference speed $v_{ref}$ from its lowered value can be realized by a ramping of the reference speed $v_{ref}$ from its lowered value to the set speed $v_{set}$, whereby a flexible reversion for the reference speed $v_{ref}$ is achieved.

The person skilled in the art will appreciate that a method for controlling a cruise control and a transmission according to the present invention can also be implemented in a computer program, which, when it is executed in a computer, instructs the computer to carry out the method. The computer program is usually constituted by a computer program product 803 stored on a digital storage medium, in which the computer program is incorporated in the computer-readable medium of the computer program product. The computer-readable medium consists of a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

FIG. 8 shows in schematic representation a control unit 800. The control unit 800 comprises a computing unit 801, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 801 is connected to a memory unit 802 arranged in the control unit 800, which memory unit provides the computing unit 801 with, for example, the stored program code and/or the stored data which the computing unit 801 requires to be able to perform computations. The computing unit 801 is also arranged to store partial or final results of computations in the memory unit 802.

In addition, the control unit 800 is provided with devices 811, 812, 813, 814 for receiving and transmitting input and output signals. These input and output signals can contain waveforms, impulses, or other attributes which, by the devices 811, 813 for the reception of input signals, can be detected as information and can be converted into signals which can be processed by the computing unit 801. These signals are then made available to the computing unit 801. The devices 812, 814 for the transmission of output signals are arranged to convert signals received from the computing unit 801 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 801 and that the above-stated memory can be constituted by the memory unit 802.

Control systems in modern vehicles commonly consist of communication bus systems consisting of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIG. 8, which is well known to the person skilled in the art within the technical field.

In the shown embodiment, the present invention is implemented in the control unit 800. The invention can also, however, be implemented wholly or partially in one or more other control units already present in the vehicle, or in some control unit dedicated to the present invention.

According to one aspect of the invention, a system for controlling a cruise control and a transmission in a vehicle over the course of a road section is provided. The system comprises a lowering unit, arranged to lower a reference speed $v_{ref}$ utilized in the cruise control during the coasting to a lowest permitted speed $v_{min}$ defined for the road section if the lowering is deemed applicable.

The system also comprises a comparison unit, arranged to compare a drive force $F_{dd}$ requested from an engine system in the vehicle with a threshold value $F_{lim}$ for the drive force.

The system also comprises an interruption unit, arranged to suspend the coasting if the requested drive force $F_{dd}$ exceeds the threshold value $F_{lim}$ for the drive force.

The system also comprises a simulation unit, which is arranged to simulate the future speed profile $v_{sim\_coast}$ for the actual speed related to coasting for the vehicle 100 over the course of the road section, in which the simulation is conducted when the road section lies ahead of the vehicle and in which the simulation unit is arranged to base the simulation at least on a road slope. This road slope is obtained from map data in combination with positioning information or from a road slope then encountered by the vehicle 100 in the simulation instance.

The system also comprises an evaluation unit, which is arranged to evaluate whether a lowering of the reference speed $v_{ref}$, which is a target value against which an engine system in the vehicle is regulated and which is utilized in said cruise control during the coasting, is applicable. The lowering is deemed applicable for a portion of the road section if the future speed profile $v_{sim\_coast}$ related to the coasting during a portion of the road section is less than a set speed $v_{set}$ for the cruise control and, at the same time, is greater than a lowest permitted speed $v_{min}$ defined for the road section.

The system, that is to say the simulation unit, the evaluation unit, the lowering unit, the comparison unit, and the interruption unit, is designed to be able to implement all the above-described embodiments of the method according to the present invention.

The person skilled in the art will appreciate, of course, that speeds and speed limit values which have been quoted in this document have equivalences and can be translated into revolution speeds and revolution speed limit values or torque and torque limit values. Likewise, the person skilled in the art will appreciate that there is a very well known correlation between distances, times and speeds, so that the herein quoted times and time periods have equivalences in positions and distances.

The person skilled in the art will also appreciate that the system above can be modified according to the different embodiments of the method according to the invention. The invention additionally relates to a motor vehicle 1, for example a truck or a bus, comprising at least one system for controlling a cruise control and a transmission according to the invention.

The present invention is not limited to the above-described embodiments of the invention but relates to and comprises all embodiments within the scope of the appended independent claims.

The invention claimed is:

1. A method for controlling a cruise control and a transmission in a vehicle over the course of a road section, wherein, prior to said road section, said vehicle has applied coasting and utilizes said cruise control the method comprising:

simulating a future speed profile $v_{sim\_coast}$ for an actual speed related to coasting for said vehicle over the course of said road section, in which simulation is conducted when said road section lies ahead of said vehicle and in which said simulation is based at least on a road slope obtained from map data in combination with positioning information or from a road slope encountered by said vehicle when said simulation is conducted;

evaluating whether a lowering of a reference speed vref, which is a target value against which an engine system in said vehicle is regulated and which is utilized in said cruise control during said coasting, is applicable, wherein said lowering is deemed applicable for a portion of said road section if said future speed profile $v_{sim\_coast}$ related to coasting during said portion is less than a set speed $V_{set}$ for said cruise control and is also greater than a lowest permitted speed $V_{min}$ defined for said road section;

lowering of said reference speed $v_{ref}$ to said lowest permitted speed $v_{min}$ if said lowering is deemed applicable;

comparing a drive force $F_{dd}$ requested from an engine system in the vehicle with a threshold value $F_{lim}$ for said drive force; and suspending said coasting in response to said requested drive force $F_{dd}$ exceeding said threshold value $F_{lim}$ for said drive force.

2. The method as claimed in claim 1, wherein said requested drive force $F_{dd}$ has a correspondence in a torque $M_{dd}$ requested in the vehicle.

3. The method as claimed in claim 2, wherein said requested torque $M_{dd}$ is a torque selected from a group consisting of, a drive wheel torque; and an engine torque.

4. The method as claimed in claim 1, wherein said requested drive force $F_{dd}$ is determined on the basis of at least one device selected from a group consisting of, a system for controlling a speed for said vehicle;

a driver-controlled throttle control mechanism;

a driver-controlled brake control mechanism; and a vehicle-specific drive force demanding device.

5. The method as claimed in claim 1, wherein said road slope is provided by a cruise control system which utilizes map data and positioning information of the vehicle in controlling the speed.

6. The method as claimed in claim 1, wherein, if said road slope corresponds to a road slope encountered by said vehicle essentially at said start of said road section, said road slope has been determined on the basis of at least one information type selected from a group consisting of, radar based information;

camera based information;

information obtained from a vehicle other than said vehicle;

positioning information and road slope information stored earlier in the vehicle; and information obtained from a traffic system related to said road section.

7. The method as claimed in claim 1, wherein said lowering of said reference speed is deemed applicable essentially directly at the point when said coasting is activated.

8. The method as claimed in claim 1, wherein said reference speed $v_{ref}$ reverts from said lowering to a set speed $v_{set}$ for said cruise control and reaches said set speed $v_{set}$ at a second moment $T_2$, at which said future speed profile $v_{sim\_coast}$ related to coasting falls below said set speed $v_{set}$ immediately prior to a third moment $T_3$, when said future speed profile $v_{sim\_coast}$ related to coasting falls below said lowest permitted speed $v_{min}$.

9. The method as claimed in claim 8, wherein said reversion is realized if a first time period $T_{12}$, from a first moment $T_1$, when said simulation is conducted, to said second moment $T_2$, is shorter than a time limit value $T_{lim}$.

10. The method as claimed in claim 8, wherein said reversion is realized by a ramping of said reference speed $v_{ref}$ from said lowest permitted speed $v_{min}$ to said set speed $v_{set}$.

11. The method as claimed in claim 1, wherein said reference speed $v_{ref}$ reverts from said lowering to a set speed $v_{set}$ for said cruise control essentially directly upon said suspension of said coasting.

12. The method as claimed in claim 1, wherein a magnitude for said lowest permitted speed $v_{min}$ is determined at least partially on the basis of information related to a cruise control system in said vehicle.

13. The method as claimed in claim 12, wherein said magnitude for said lowest permitted speed $v_{min}$ is related to a reference speed $v_{ref}$ which is utilized by said cruise control system.

14. The method as claimed in claim 12, wherein said determination of said magnitude for said lowest permitted speed $v_{min}$ is realized by said cruise control system.

15. The method as claimed in claim 12, wherein said magnitude for said lowest permitted speed $v_{min}$ is altered dynamically.

16. The method as claimed in claim 1, wherein a magnitude for said lowest permitted speed $v_{min}$ is related to a current actual speed $v_{act}$ for said vehicle.

17. A computer program product comprising a non-transitory computer-readable medium and a computer program comprising a program code, stored in said non-transitory computer readable medium, wherein when said program code is executed in a computer, said program code instructs said computer to carry out a method for controlling a cruise control and a transmission in a vehicle over the course of a road section, wherein, prior to said road section, said vehicle has applied coasting and utilizes said cruise control, the method comprising:

simulating a future speed profile $v_{sim\_coast}$ for an actual speed related to coasting for said vehicle over the course of said road section, in which simulation is conducted when said road section lies ahead of said vehicle and in which said simulation is based at least on a road slope obtained from map data in combination with positioning information or from a road slope encountered by said vehicle when said simulation is conducted;

evaluating whether a lowering of a reference speed vref, which is a target value against which an engine system in said vehicle is regulated and which is utilized in said cruise control during said coasting, is applicable, wherein said lowering is deemed applicable for a portion of said road section if said future speed profile $v_{sim\_coast}$ related to coasting during said portion is less than a set speed $V_{set}$ for said cruise control and is also greater than a lowest permitted speed $V_{min}$ defined for said road section;

lowering of said reference speed $v_{ref}$ to said lowest permitted speed $v_{min}$ if said lowering is deemed applicable;

comparing a drive force $F_{dd}$ requested from an engine system in the vehicle with a threshold value $F_{lim}$ for said drive force; and suspending said coasting in response to said requested drive force $F_{dd}$ exceeding said threshold value $F_{lim}$ for said drive force.

18. A system for controlling a cruise control and a transmission in a vehicle over the course of a road section, wherein, prior to said road section, said vehicle has applied coasting and utilizes said cruise control; the system comprising:

a simulation unit configured to simulate a future speed profile $v_{sim\_coast}$ for an actual speed related to coasting for said vehicle over the course of said road section, in which said simulation is conducted when said road section lies ahead of said vehicle and in which said simulation is based at least on a road slope obtained from map data in combination with positioning information of said vehicle or from a road slope encountered by said vehicle when said simulation is conducted;

an evaluation unit configured to evaluate whether a lowering of a reference speed $v_{ref}$, which is a target value against which an engine system in said vehicle is regulated and which is utilized in said cruise control during said coasting, is applicable, wherein said lowering is deemed applicable for a portion of said road section if said future speed profile $v_{sim\_coast}$ related to coasting during said portion is less than a set speed $v_{set}$ for said cruise control and, is also greater than a lowest permitted speed $v_{min}$ defined for the road section;

a lowering unit configured to lower said reference speed $v_{ref}$ to said lowest permitted speed $v_{min}$ if said lowering is deemed applicable;

a comparison unit configured to compare a drive force $F_{dd}$ requested from an engine system in the vehicle with a threshold value $F_{lim}$ for said drive force; and an interruption unit configured to suspend said coasting in response to said requested drive force $F_{dd}$ exceeding said threshold value $F_{lim}$ for said drive force.

* * * * *